(12) United States Patent
Cerf et al.

(10) Patent No.: US 6,418,138 B1
(45) Date of Patent: Jul. 9, 2002

(54) INTERNET RADIO COMMUNICATION SYSTEM

(75) Inventors: Vinton Cerf, Annandale, VA (US); Scott Huddle, Washington, DC (US)

(73) Assignee: WorldCom, Inc., Cinton, MS (US)

( * ) Notice: Subject to any disclaimer, the term of this patent is extended or adjusted under 35 U.S.C. 154(b) by 0 days.

(21) Appl. No.: 09/517,250

(22) Filed: Mar. 2, 2000

(51) Int. Cl.[7] .............................................. H04L 12/66
(52) U.S. Cl. ........................ 370/352; 370/355; 455/414
(58) Field of Search ................................ 370/464, 465, 370/466, 467, 389, 390, 391, 392, 401, 432, 352, 353, 355, 901, 913; 455/422, 424, 428, 425, 426, 414

(56) References Cited

U.S. PATENT DOCUMENTS

| 6,122,514 A | * | 9/2000 | Spaur | 455/448 |
| 6,161,008 A | * | 12/2000 | Lee | 455/414 |
| 6,181,697 B1 | * | 1/2001 | Nurenberg | 370/390 |

* cited by examiner

*Primary Examiner*—Douglas Olms
*Assistant Examiner*—Ricardo M. Pizarro

(57) ABSTRACT

A novel communication system including mobile units distributed within a wireless communication network which are connected to a packet switched network (e.g., the Internet) via a proxy server is disclosed. The proxy server converts unicast data packets coming from the packet switched network to multicast data packets being transmitted to the mobile units, and is also responsible for the overall management and control of the communication system.

36 Claims, 6 Drawing Sheets

INTERNET RADIO COMMUNICATION SYSTEM

BACKGROUND OF THE INVENTION

1. Field of the Invention

The present invention relates to a communication system, and more specifically relates to an Internet radio communication system including a plurality of mobile units (e.g., Internet radios) distributed within a wireless communication network.

2. Discussion of the Background

Currently, a user may connect to the Internet via a wireless network. Thus, the user may perform Internet activities without needing phone lines or cable connectors. For example, FIG. 1 illustrates a Ricochet wireless Micro-Cellular Data Network (MCDN) developed by METRICOM. The Ricochet Network is a wide-area wireless system using spread-spectrum, packet-switching data technology and a frequency-hopping mesh architecture. The network operates within the license-free (902–998 MHZ) range of the Radio Frequency (RF) spectrum, providing Ricochet subscribers with an affordable wireless solution and an alternative to standard telephone modems requiring phone line connections.

As shown in FIG. 1, the Ricochet wireless network includes a Ricochet wireless modem 100, which weighs about 13 ozs., attached to a laptop computer 102. The network also includes shoebox-size radio transceivers 106, which are typically mounted to street lights or utility poles 104. The radio transceivers 106 require only a small amount of power from the street light itself (connected with a special adapter) and are otherwise self-contained units (no other wiring or connections are necessary). In addition, the microcell radio transceivers 106 are strategically placed every quarter to half mile in a checkerboard pattern. Each radio transceiver 106 employs 162 frequency-hopping channels, and uses a randomly selected hopping sequence. This allows for a very secure network, and enables many subscribers use of the network at the same time.

In addition, within a 20-square mile radius (containing about 100 radio transceivers), the Ricochet network includes Wired Access Points (WAPS) 108. WAPS 108 collect and convert the RF packets into a format for transmission to a T1 frame-relay connection to a wired IP network backbone in a network interconnection facility 110.

The Ricochet network also includes a Ricochet name server 114, which resides on the Metricom backbone provided within the network interconnection facility 110 and provides connection validation and path information to the Ricochet modems 100. All connection requests go to the name server 114 for authorization before a connection can be made. When a Ricochet modem 100 is first powered on, it sends a packet to the name server 114 containing the Ricochet modem's serial number. The name server 114 validates the subscription and the service request. If either the subscriber serial number is invalid or the requested service is not what the subscriber has purchased, the accessed request is denied. Only after the Ricochet modem 100 successfully registers with the name server 114 can the subscriber obtain Internet or phone line service access to the Ricochet network. The router 107 and gateway 109 provide a connection between the Internet 112 and Ricochet wireless network.

Further, the Ricochet network distributes data between the Internet 112 and the laptop computer 102 using a unicast transmission method. Unicast transmission is designed to transmit a single packet to a single destination and is inherently a point-to-point type of communication. If a node wants to send the same information to many destinations, it must send a copy of the same data to each recipient in turn. That is, the same information must be carried over the network multiple times.

One problem with a wireless network based on the unicasting transmission method is tens of thousands of subscribers simultaneously access the network, and many of these subscribers may be accessing the same information. Thus, in the unicast transmission method, there is a substantial replication of data packets. Accordingly, bandwidth usage is inefficient and some users may be prevented from accessing the network during peak times, for example. Further, the name server 114 does not provide sufficient management and control operations for the network. Thus, the only way a user knows the system is at maximum capacity, for example, is by attempting to log onto the network and finding that he or she is unable to access the network.

SUMMARY OF THE INVENTION

Accordingly, one object of the present invention is to solve the above and other noted problems.

Another object of the present invention is to provide a novel Internet radio communication system which transmits data between a mobile unit (e.g., an Internet radio) and the Internet using a multicasting transmission method if more than one user selects a same Internet service.

Yet another object of the present invention is to provide a proxy server for determining a system capacity of the network, managing the network, and converting unicast data packets to multicast data packets, for example.

To achieve these and other objects, the present invention provides a novel communication system including mobile units distributed within a wireless communication network which are connected to a packet switched network (e.g., the Internet) via a proxy server. The proxy server converts unicast data packets coming from the packet switched network to multicast data packets being transmitted to the mobile units, if more than one mobile unit requests a same service (e.g., a same Uniform Resource Locator—URL). The proxy server is also responsible for the overall management and control of the communication system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
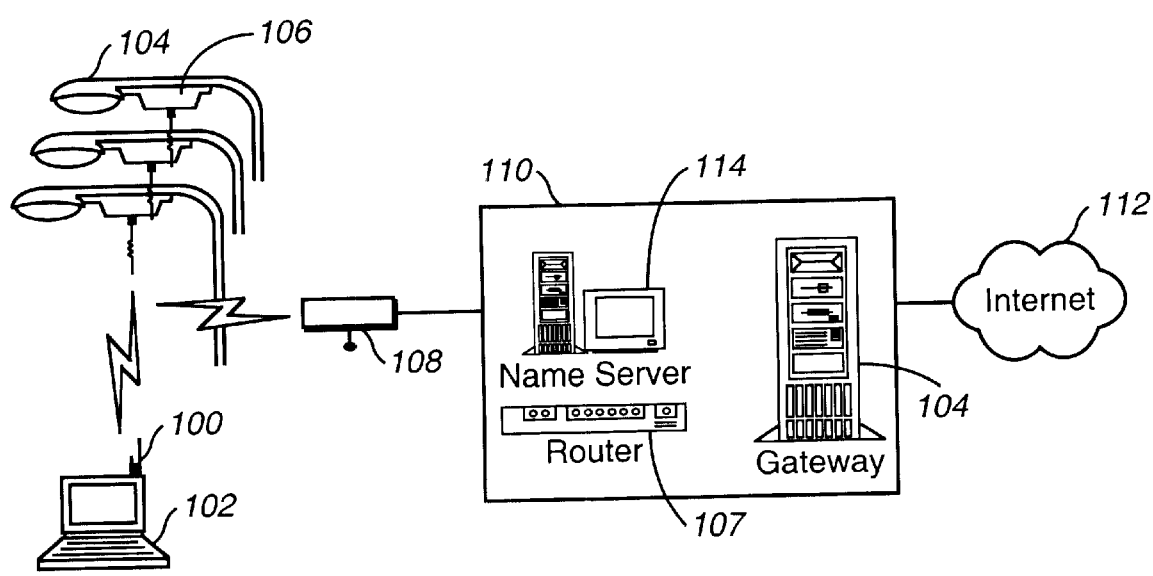
FIG. 1 is a schematic of a conventional wireless network.
Figure 2:
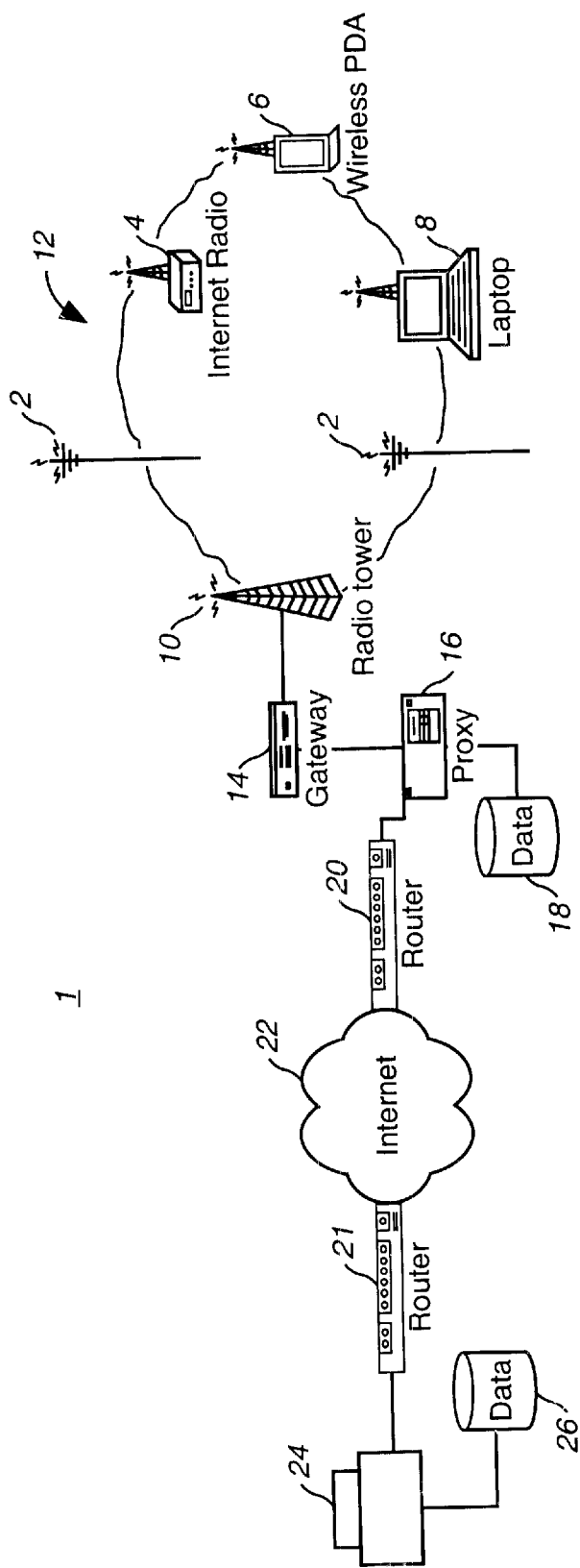
FIG. 2 is a schematic of an Internet radio communication system according to an embodiment of the present invention.

Referring now to the drawings, wherein like reference numerals designate identical or corresponding parts throughout the several views, FIG. 2 is a schematic of an Internet radio communication system 1 according to the present invention. As shown, the Internet radio communication system 1 includes a wireless communication network 12. In contrast to the conventional network of FIG. 1, the wireless network 12 according to an embodiment of the present invention is configured to receive and transmit multicast data packets. The wireless network 12 includes, but is not limited to, radio transmitters 2, a radio tower 10, a wireless Personal Digital Assistant 6 (PDA), a laptop computer 8, and an Internet radio 4. The radio tower 10, a gateway 14, a proxy server 16 and a router 20 allow connection of the wireless network 12 to the Internet 22. The Internet 22 is also connected to at least one source 24, which includes a data device 26, via a router 21.

The communication system according to an embodiment of the present invention includes at least the following novel features: 1) an Internet radio, 2) a proxy server which provides a variety of control mechanisms and management functions of the communication system, and 3) communication is performed by multicasting. Each of these features will now be described.

Internet Radio

Figure 3:
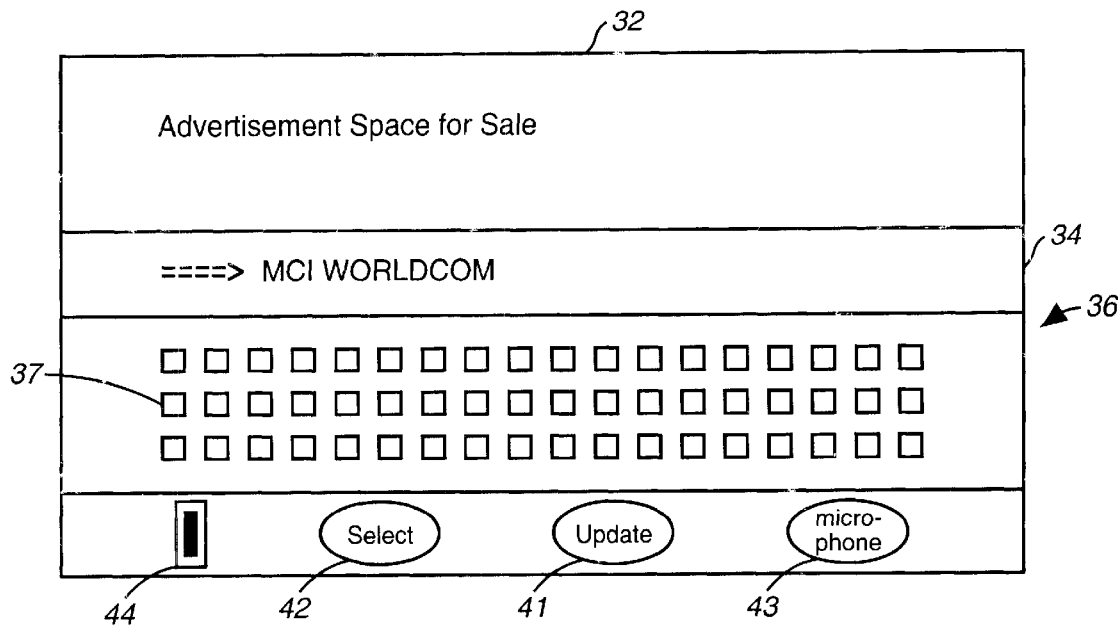
FIG. 3 is a schematic of display regions and a keypad of an Internet radio according to an embodiment of the present invention.

One example of the Internet radio 4 according to an embodiment of the present invention is shown in FIG. 3. The Internet radio 4 includes a first display region 32 for displaying an advertisement, for example, and a second display region 34 for inputting information corresponding to a requested Internet service. For example, the second display region 34 includes the term "MCI WORLDCOM" which is a hyperlink to the Internet website "www.wcom.com." The hyperlink may be input into the second display region 34 using a keypad 36. The keypad 36 includes a plurality of alpha and numerical keys 37, a tuner 44, a select button 42, an update button 41 and a microphone 43. The user may also enter an entire website address using the keypad 36. The Internet radio 4 may also be voice activated. That is, a user may input a hyperlink or entire website address using the microphone 43. Once the desired website or hyperlink is input, the user may press the select button 42 to select that website. The user may also use the tuner 44 to scroll through a predetermined list of websites. Further, the tuner 44 is shown as a dial, however, the tuner 44 may also be "Up and Down" arrow keys allowing the user to scroll through a list of predetermined websites. The update button 41 may be selected to display a list of predetermined websites currently available (this feature will be discussed in more detail later).

Further, the Internet radio 4 may be installed in a dashboard of an automobile. Thus, the user may listen to a baseball game that is not locally transmitted. This differs from a typical radio, which is limited to receiving only those baseball games which are transmitted in a respective city. Further, the keypad 36 may also be foldably connected to the first and second display regions 32, 34 such that the keypad 36 covers the display regions 32, 34.

Figure 4:
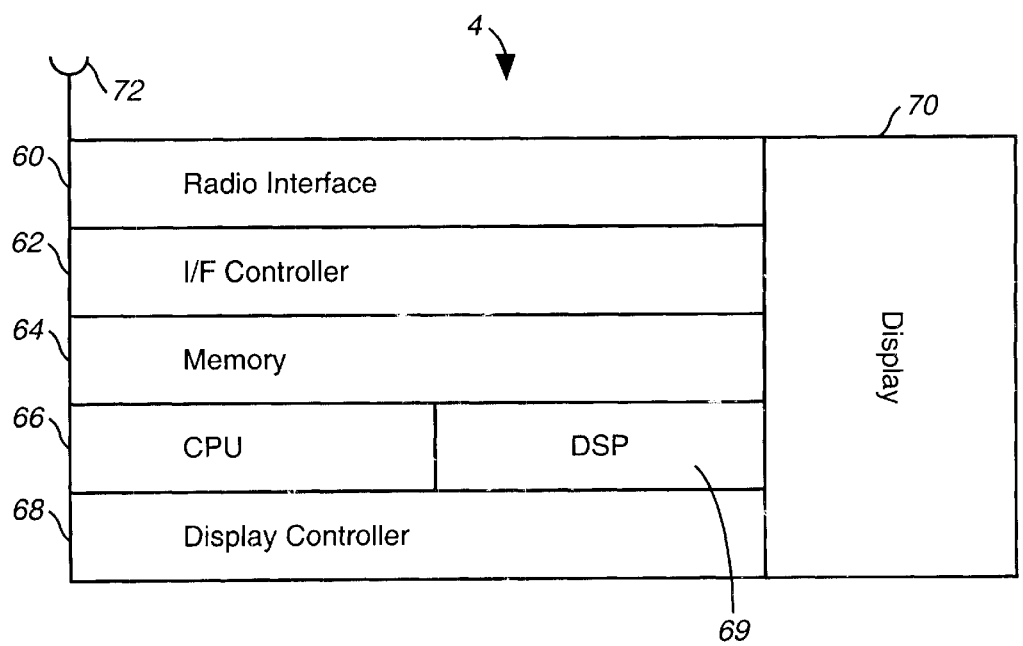
FIG. 4 is a block diagram illustrating components of the Internet radio according to an embodiment of the present invention.

FIG. 4 is a block diagram illustrating components of the Internet radio 4. As shown, the Internet radio 4 includes an antenna 72, a radio interface 60, an interface controller 62, a memory 64, a CPU 66, a digital signal processor 69, a display controller 68 and a display 70.

Proxy Server

The proxy server 16 provides a variety of control mechanisms and management functions of the communication system according to the present invention. For example, the proxy server 16 acts as a local depository of cached radio programs, and provides directory services of current offerings (e.g., live radio programs). A "live" radio program is, for example, a baseball game that is currently being played and thus a user may listen to the "live" radio program. The proxy server 16 also acts as a bridge between unicast sources on the Internet side and multicast listeners on the wireless network. That is, the proxy server 16 is configured to convert unicast data packets coming from the Internet side to multicast data packets for transmission to the mobile units. The proxy server 16 also decides whether a sufficient network capacity exists to process a user's request. This may be achieved by statistically determining how many channels are currently being used versus how many channels are available. The proxy server 16 may also cache data coming from the Internet to smooth out transmission (i.e., in a case the transmission speed of the Internet is different than for the wireless network).

In an exemplary embodiment of the present invention, the proxy server 16 continuously receives information from the source 24 of the Internet 22 for a predetermined list of channels. A user may then select the update push button 41 of the Internet radio 4 to inquire about available channels. The proxy server 16 then transmits the predetermined list of channels that it is continuously receiving to the Internet radio 4. The user may then scroll through the predetermined list of channels on the second display region 34 and select a desired channel via the select button 42 (see FIG. 3). The channels currently available may also be transmitted to Internet radio 4 when the Internet radio 4 is first turned on, or periodically, for example.

In another exemplary embodiment of the present invention, the user may "dial on demand" a particular website that he or she wishes to receive. The particular website (or hyperlink) may be entered using the keypad 36 or microphone 43 of the Internet radio 4 as discussed above. In this example, the proxy server 16 receives and processes the request from the Internet radio 4. A list of "favorite" channels may also be stored in the memory 64 of the Internet radio 4 and the user may then scroll through this list.

Multicasting

A description of multicasting according to the present invention will now be given. IP multicast is an extension of IP, and is a mechanism for transmitting IP datagrams from one source to many destinations in a LAN or WAN. In an embodiment of the present invention, the IP datagrams are transmitted to mobile units (e.g., Internet radios, PDA's, etc.), which are distributed within a wireless network (rather than a hard wired LAN or WAN, for example). Multicast data packets are addressed to a group of mobile units, rather than to a single mobile unit; it is the responsibility of the network to forward the packets to only the mobile units that need to receive them. The mobile units which request the same Internet service are designated as a specific group. Thus, with IP multicast, the proxy server 16 may send one copy of the information to a plurality of mobile units. In addition, multicasting is connectionless, which means that a multicast datagram is neither guaranteed to reach all members of the group nor guaranteed to arrive in the same order as it was sent. The protocol delivers a multicast datagram to the destination group members on a best-effort basis. However, upper layer protocols (e.g., TCP and UDP) introduce reliable delivery services. Further information about multicasting may be found in MARCUS GONCALVES ET AL., *IP Multicasting: Concepts and Applications*, (McGraw Hill, 1999), which is incorporated by reference in its entirety.

Figure 5:
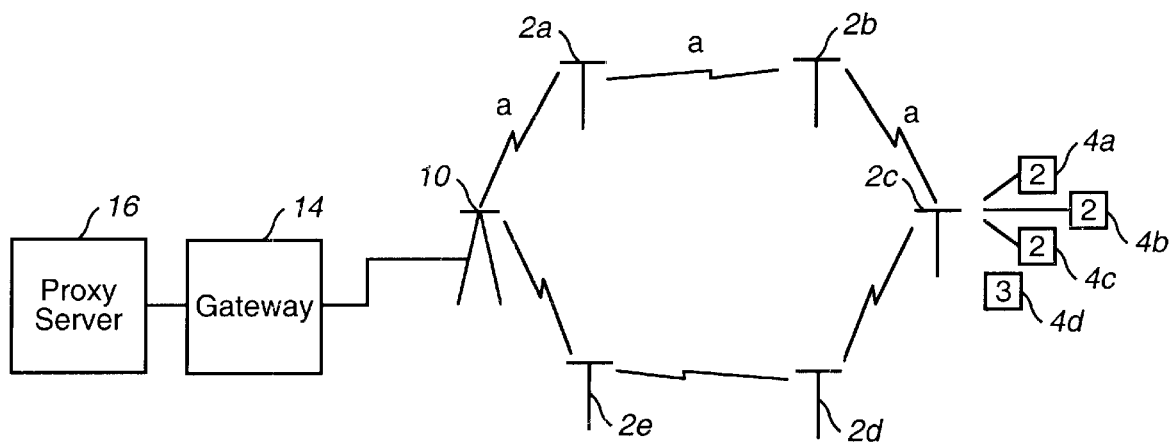
FIG. 5 is a schematic of a multicasting operation according to an embodiment of the present invention.

For example, as shown in FIG. 5, the proxy server 16 may send only one copy of requested information (denoted as "a" in the figure) to the radio transmitters 2a, 2b and 2c via the gateway 14 and radio tower 10. The radio transmitters 2a, 2b, 2c, 2d, and 2e are configured as multicasting "routers." The radio transmitter 2c then distributes a copy to each of the Internet radios 4a, 4b, and 4c. The Internet radios 4a, 4b and 4c are illustrated as a same group because they requested the same Internet service (e.g., channel number 2 corresponding to a baseball game, for example). An Internet radio 4d which requests a channel number 3, for example, does not receive the baseball game. Thus, as can be seen, multicasting saves a considerable amount of bandwidth needed to operate the communication system. If unicasting was used, a separate copy would be sent to each Internet radio. That is, in the link between the base station 10 and the radio transmitter 2a, for example, three copies of data "a" would be sent (i.e., one copy for each of the Internet radios 4a, 4b and 4c which requested the same Internet service).

As previously discussed, the proxy server 16 is configured to convert unicast data packets coming from the Internet to multicast data packets going to the mobile units. To achieve this, the proxy 16 converts the address scheme of unicast to multicast.

The destination address field of the IP header in a multicast IP data packet includes a Class D group address instead of a Class A, B, or C IP address. A Class D address is an IP address and has the format 224.0.0.0–239.255.255.255. In Class D addressing, the lower 256 entries of the address range are reserved for administrative functions and system-level routing chores. The middle range is for use by end-user multicast applications within groups, intranets, and the Internet. The upper range of the Class D address set is reserved for locally administered or site-specific multicast applications.

Mobile units (e.g., Internet radios 4, PDA's 6, etc.) willing to receive multicast messages (data packets) need to inform their immediately-neighboring multicast-aware radio transceiver 2 that they are interested in receiving multicast messages sent to certain multicast groups. This way, each mobile unit can become a member of one or more multicast groups and receive the multicast packets sent to those groups. The protocol through which mobile units communicate this information with their local radio transceiver 2 is called Internet Group Management Protocol (IGMP). The IGMP is also used by the radio transceiver 2 to periodically check whether the known group members are still active.

Figure 6:
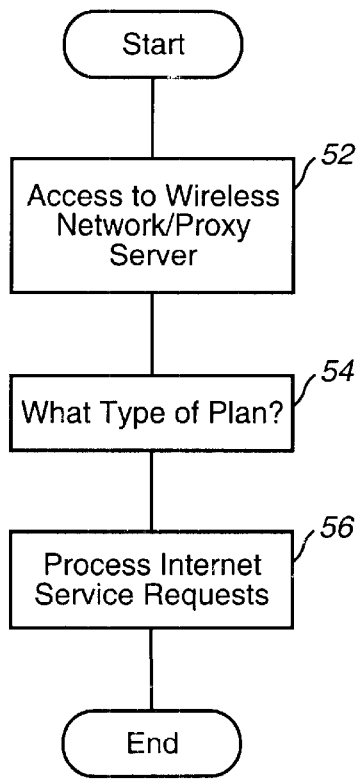
FIG. 6 is a flowchart illustrating operational steps performed for communication between the Internet and mobile units according to an embodiment of the present invention.

Turning now to an operation of the communication system according to the present invention. A description will be given with respect to a user using the Internet radio 4, however, the user may also use the wireless PDA 6 or the laptop computer 8, for example. Referring to FIG. 6, after the Internet radio 4 is turned on, the Internet radio 4 accesses to the wireless network 12 (step S2). The proxy server 16 provides connection validation and path information, and all connection requests go through the proxy server 16 for authorization before a connection can be made. When the Internet radio 4 is first powered on, it sends a packet to the proxy server 16 including the Internet radio's 4 serial number. The proxy server 16 then validates the subscription and the service request. If either the subscription serial number is invalid or the service being requested is not what the subscriber has purchased, the access request is denied. Only after the Internet radio 4 successfully registers with the proxy server 16, can the subscriber obtain Internet service on the wireless network. The proxy server 16 also determines in step S4 what type of plan the user has subscribed to (e.g., "dial on demand" or a "standard package"). The type of plan may be determined from a table stored in the proxy server, which includes the address of the mobile unit and the type of plan, for example. Then, the proxy server 16 processes the requests of the Internet radio (step S6).

Figure 7:
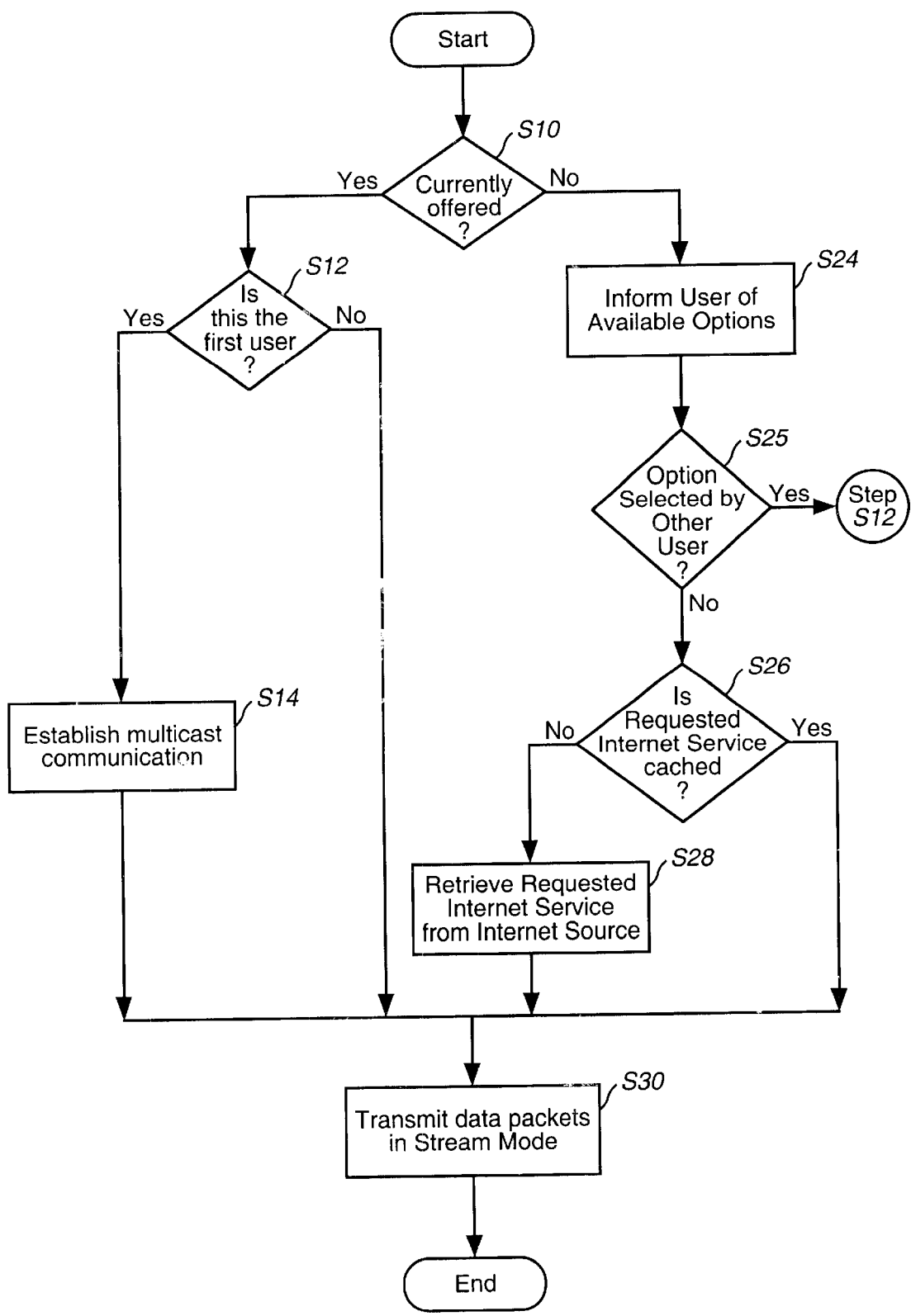
FIG. 7 is a flow chart illustrating operational steps of a proxy server connected between the Internet and mobile units according to an embodiment of the present invention.

FIG. 7 is a flowchart illustrating operational steps of the proxy server 16. After the Internet radio 4 has accessed the wireless network 12 and their proxy server 16 has determined the type of plan the Internet radio 4 has subscribed to, etc., the user may request a desired Internet service. Then, in step S10, the proxy server 16 determines whether the requested service is currently offered (i.e., whether the requested channel is "live" or prerecorded).

If the desired Internet service is not currently offered ("No" in step S10), the proxy server 16 informs the user of available options (step S24). The available options may include, but are not limited to, a list of currently in-progress multicasts, a most recent multicast, the five most popular multicasts, etc. The proxy server 16 then determines whether the option selected by the user has been selected by another user (step S25). If the option has been selected by another user, the proxy server 16 executes step S12 and the appropriate following steps. If the user is the first to select an option, the proxy server 16 determines whether the requested option (i.e., Internet service) is cached by the proxy server 16 (step S26). If the service is cached ("Yes" in step S26), the proxy server 16 transmits in stream mode the requested Internet service to the user (step S30). If the requested Internet service is not cached by the proxy server 16, the proxy server 16 retrieves the requested Internet service from the source 24 of the Internet 22 (step S28) and then transmits this retrieved file to the user (step S30).

Returning now to step S10. If the requested Internet service is currently offered, such as a baseball game currently being played ("Yes" in step S10), the proxy server 16 determines whether this is the first user to request the Internet service (step S12). If it is not the first user ("No" in step S12), the proxy server 16 transmits in streaming mode the requested Internet service to the user (step S30). That is, multicasting has previously been established for the first user, and thus the currently offered Internet service is being transmitted via multicasting. Therefore, the newly joined multicast ready Internet radio will receive the transmitted multicast data packets. If it is the first user to request the Internet service ("Yes" in step S12), the proxy server 16 establishes multicasting (step S14) and then transmits the requested Internet service to the user. Further, in this example, the proxy server establishes multicast communication for the first user. However, it is possible to establish multicast communication only if more than one user requests a same Internet service. That is, it is possible to transmit in unicast (no conversion is necessary) if only one user has requested an Internet service. The proxy server 16 may determine if more than one user has requested a same service by maintaining a table including an address of the mobile unit, the type of plan, and the requested service, for example. Thus, the proxy server 16 may read this table and determine if more than one user (i.e., mobile unit) has requested the same Internet service. The proxy server 16 may also provide the user with the capability of indexing a particular multicast. For example, the user may listen to the third quarter of a football game by indexing the multicast to that quarter.

In addition, data transmitted between the Internet and mobile units may be, but is not limited to, video, audio, text, graphic, still video and programmatic data (e.g., software updates and any other information representable in digital form).

All or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

Figure 8:
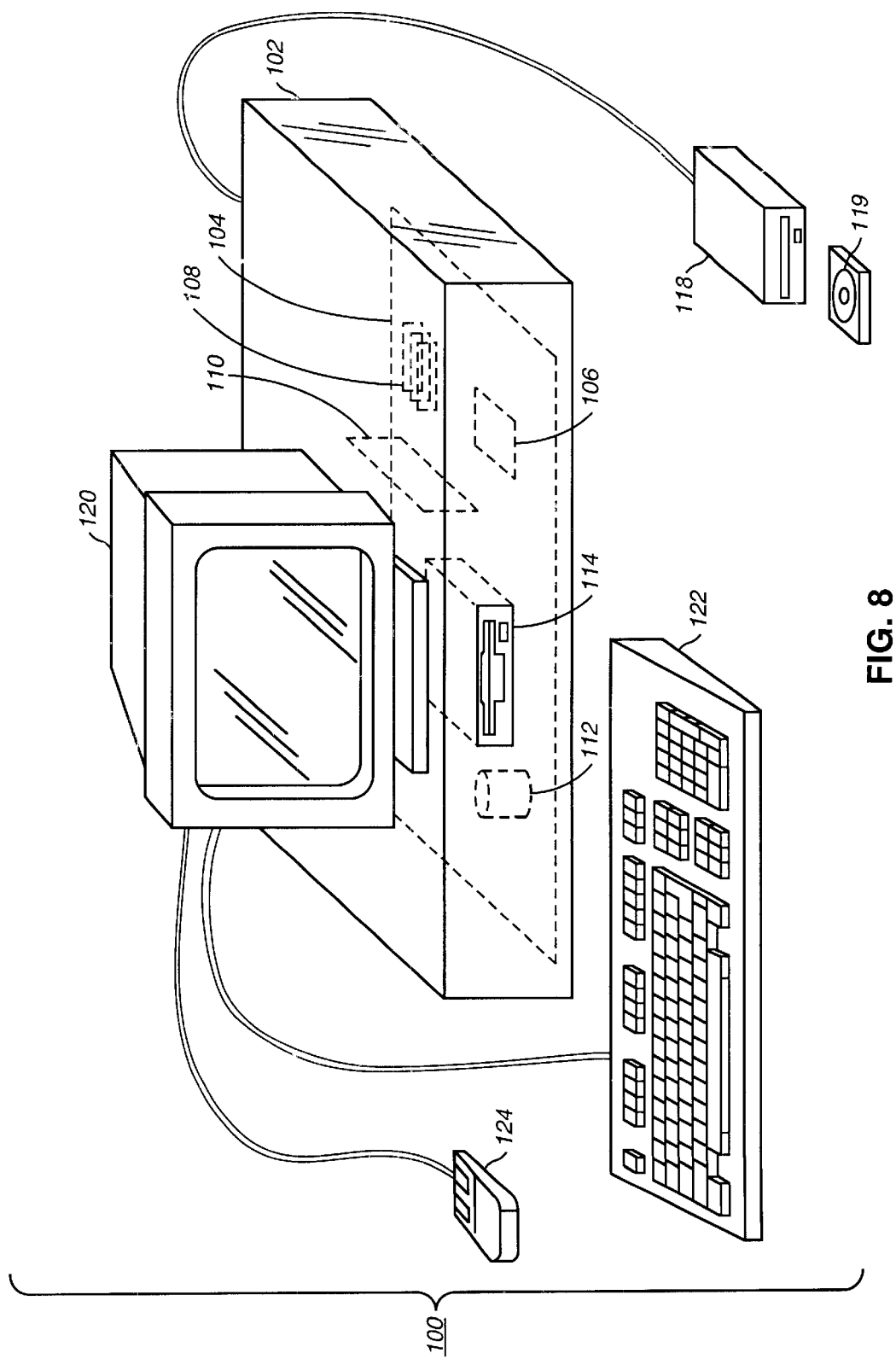
FIG. 8 is a schematic illustration of a computer system (e.g., proxy server) for implementing the method of the present invention.

FIG. 8 is a schematic illustration of a computer system 100 for implementing the method of the present invention. The computer system 100 includes a computer housing 102 for housing a mother board 104, which contains a CPU 106, a memory 108 (e.g., random access memory (RAM) dynamic RAM (DRAM), static RAM (SRAM), synchronous DRAM (SDRAM), flash RAM, read-only memory (ROM), programmable ROM (PROM), erasable PROM (EPROM), and electrically erasable PROM (EEPROM)), and other optional special purpose logic devices (e.g., application specific integrated circuits (ASICs)) or configurable logic devices (e.g., generic array of logic (GAL) or reprogrammable field programmable gate arrays (FPGAs)). The computer system 100 also includes plural input devices, such as a keyboard 122 and a mouse 124, and a display card 110 for controlling a monitor 120. In addition, the computer system 100 further includes a floppy disk drive 114; other removable media devices (e.g., a compact disc 119, a tape, and a removable magneto-optical media); and a hard disk 112, or other fixed, high density media drives, connected using an appropriate device bus (e.g., a small computer system interface (SCSI) bus, and enhanced integrated device electronics (IDE) bus, or an ultra-direct memory access (DMA) bus). The computer system 100 may additionally include a compact disc reader 118, a compact disc reader-writer unit, or a compact disc juke box, each of which may be connected to the same device bus or another device bus. Although the compact disc 119 is shown in a CD caddy, the compact disc 119 can be inserted directly into CD-ROM drives which do not require caddies.

As stated above, the system includes at least one computer readable medium or memory programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user (e.g., a consumer). Such software may include, but is not limited to, device drivers, operating systems and user applications, such as development tools. Such computer readable media further includes the computer program product of the present invention for performing all or a portion (if processing is distributed) of the processing performed in implementing the invention. The computer code devices of the present invention can be any interpreted or executable code mechanism, including but not limited to, scripts, interpreters, dynamic link libraries, Java classes, and complete executable programs. Moreover, parts of the processing of the present invention may be distributed for better performance, reliability, and/or cost.

Obviously, numerous modifications and variations of the present invention are possible in light of the above teachings. It is therefore to be understood that within the scope of the appended claims, the invention may be practiced otherwise than as specifically described herein.

What is claimed is:

1. A communication system, comprising:

a mobile unit distributed within a wireless communication network and configured to request a service of a packet switched network from a data source on the packet switched network; and a proxy server connected between the packet switched network and the wireless communication network and configured to convert unicast data packets coming from the packet switched network to multicast data packets for transmission to the mobile unit, wherein the proxy server is configured to determine whether a requested service is currently offered, and the proxy server is configured to provide a user using the mobile unit a plurality of available options if the requested service is not currently offered.

2. A communication system, comprising:

a mobile unit distributed within a wireless communication network and configured to request a service of a packet switched network from a data source on the packet switched network; and a proxy server connected between the packet switched network and the wireless communication network and configured to convert unicast data packets coming from the packet switched network to multicast data packets for transmission to the mobile unit, wherein the proxy server is configured to determine a current system capacity of the communication system and to notify the mobile unit if a requested service cannot be provided.

3. A communication system, comprising:

a mobile unit distributed within a wireless communication network and configured to request a service of a packet switched network from a data source on the packet switched network; and a proxy server connected between the packet switched network and the wireless communication network and configured to convert unicast data packets coming from the packet switched network to multicast data packets for transmission to the mobile unit, wherein the mobile unit is configured to store a predetermined list of available services transmitted from the proxy server, and the mobile unit receives the predetermined list of available services when at least one of the following conditions occur: 1) the mobile unit is powered ON, 2) at predetermined time intervals, and 3) when requested by a user.

4. A communication method, comprising the steps of:

establishing a connection between a packet switched network and a mobile unit distributed within a wireless communication network;

requesting a service from a data source on the packet switched network;

converting, via a proxy server connected between the packet switched network and the wireless communication network, unicast data packets coming from the packet switched network to multicast data packets for transmission to the mobile unit;

determining, via the proxy server, whether a requested service is currently offered; and informing a user using the mobile unit about a plurality of available options if the requested service is not currently offered.

5. A communication method, comprising the steps of:

establishing a connection between a packet switched network and a mobile unit distributed within a wireless communication network;

requesting a service from a data source on the packet switched network;

converting, via a proxy server connected between the packet switched network and the wireless communication network, unicast data packets coming from the packet switched network to multicast data packets for transmission to the mobile unit;

determining, via the proxy server, a current system capacity of the communication system; and notifying the mobile unit if a requested service cannot be provided.

6. A communication method, comprising the steps of:

establishing a connection between a packet switched network and a mobile unit distributed within a wireless communication network;

requesting a service from a data source on the packet switched network;

converting, via a proxy server connected between the packet switched network and the wireless communication network, unicast data packets coming from the packet switched network to multicast data packets for transmission to the mobile unit;

storing, via the mobile unit, a predetermined list of available services transmitted from the proxy server; and receiving, via the mobile unit, the predetermined list of available services when at least one of the following conditions occur: 1) the mobile unit is powered ON, 2) at predetermined time intervals, and 3) when requested by a user.

7. A computer-readable medium carrying one or more sequences of one or more instructions for synchronizing a database of source documents, the one or more sequences of one or more instructions including instructions which, when executed by one or more processors, cause the one or more processors perform the steps of:

establishing a connection between a packet switched network and a mobile unit distributed within a wireless communication network;

requesting a service from at least one data source on the packet switched network;

converting, via a proxy server connected between the packet switched network and the wireless communication network, unicast data packets coming from the packet switched network to multicast data packets for transmission to the mobile unit;

determining, via the proxy server, whether a requested service is currently offered; and informing a user using the mobile unit about a plurality of available options if the requested service is not currently offered.

8. A computer-readable medium carrying one or more sequences of one or more instructions for synchronizing a database of source documents, the one or more sequences of one or more instructions including instructions which, when executed by one or more processors, cause the one or more processors perform the steps of:

establishing a connection between a packet switched network and a mobile unit distributed within a wireless communication network;

requesting a service from at least one data source on the packet switched network;

converting, via a proxy server connected between the packet switched network and the wireless communication network, unicast data packets coming from the packet switched network to multicast data packets for transmission to the mobile unit;

determining, via the proxy server, a current system capacity of the communication system; and notifying the mobile unit if a requested service cannot be provided.

9. A computer-readable medium carrying one or more sequences of one or more instructions for synchronizing a database of source documents, the one or more sequences of one or more instructions including instructions which, when executed by one or more processors, cause the one or more processors perform the steps of:

establishing a connection between a packet switched network and a mobile unit distributed within a wireless communication network;

requesting a service from at least one data source on the packet switched network;

converting, via a proxy server connected between the packet switched network and the wireless communication network, unicast data packets coming from the packet switched network to multicast data packets for transmission to the mobile unit; and receiving, via the mobile unit, a predetermined list of available services from the proxy server when at least one of the following conditions occur: 1) the mobile unit is powered ON, 2) at predetermined time intervals, and 3) when requested by a user.

10. The system according to claim 1, wherein the plurality of options include at least one of 1) a list of currently in-progress multicasts, 2) a most recent multicast, and 3) a list of most popular multicasts.

11. The system according to claim 1, wherein the proxy server is configured to cache a plurality of services from the data source on the packet switched network.

12. The system according to claim 1, wherein the proxy server is configured to continuously receive a plurality of currently offered services.

13. The system according to claim 1, wherein the mobile unit comprises at least one of an Internet radio, a Personal Digital Assistant (PDA), and a laptop computer.

14. The system according to claim 1, wherein the mobile unit includes:

an input mechanism configured to input a requested service; and a display region configured to display an advertisement and the requested service.

15. The system according to claim 14, wherein the input mechanism is foldably connected to the display so that the input mechanism covers the display.

16. The system according to claim 14, wherein the input mechanism comprises at least one of 1) a keypad configured to input the requested service, 2) a dial configured to scroll through a list of predetermined services, 3) UP and DOWN arrow keys configured to scroll through the list of predetermined services, 4) a selecting mechanism configured to select one of the predetermined services and 5) a voice activated mechanism.

17. The system according to claim 1, wherein data transmitted between the source on the packet switched network and the mobile unit includes at least one of 1) video, 2) audio, 3) text, 4) graphic, 5) still video, and 6) programmatic data.

18. The system according to claim 1, wherein the packet switched network is an Internet Protocol based network.

19. The system according to claim 18, wherein the Internet Protocol based network is the Internet.

20. The system according to claim 1, further comprising additional mobile units.

21. The method according to claim 4, wherein the plurality of options include at least one of 1) a list of currently in-progress multicasts, 2) a most recent multicast, and 3) a list of most popular multicasts.

22. The method according to claim 4, further comprising the step of:
   caching, via the proxy server, a plurality of services from the data source on the packet switched network.

23. The method according to claim 4, further comprising the step of:
   continuously receiving, via the proxy server, a plurality of currently offered services.

24. The method according to claim 4, wherein the mobile unit comprises at least one of an Internet radio, a Personal Digital Assistant (PDA), and a laptop computer.

25. The method according to claim 4, wherein the mobile unit includes:
   an input mechanism configured to input a requested service; and
   a display configured to display an advertisement and the requested service.

26. The method according to claim 25, wherein the input mechanism is foldably connected to the display so that the input mechanism covers the display.

27. The method according to claim 25, wherein the input mechanism comprises at least one of 1) a keypad configured to input the requested service, 2) a dial configured to scroll through a list of predetermined services, 3) UP and DOWN arrow keys configured to scroll through the list of predetermined services, 4) a selecting mechanism configured to select one of the predetermined services, and 5) a voice activated mechanism.

28. The method according to claim 4, further comprising the step of:
   storing, via the mobile unit, a predetermined list of available services transmitted from the proxy server.

29. The method according to claim 4, wherein data transmitted between the source on the packet switched network and the mobile unit includes at least one of 1) video, 2) audio, 3) text, 4) graphic, 5) still video, and 6) programmatic data.

30. The method according to claim 4, wherein the packet switched network is an Internet Protocol based network.

31. The method according to claim 30, wherein the Internet Protocol based network is the Internet.

32. The method according to claim 4, wherein the establishing step is performed with additional mobile units.

33. The computer-readable medium according to claim 7, wherein the plurality of options include at least one of 1) a list of currently in-progress multicasts, 2) a most recent offered multicast, and 3) a list of most popular multicasts.

34. The computer-readable medium according to claim 7, wherein the one or more processors further perform the step of:
   caching, via the proxy server, a plurality of services from the data source on the packet switched network.

35. The computer-readable medium according to claim 7, wherein the one or more processors further perform the step of:
   continuously receiving, via the proxy server, a plurality of currently offered services.

36. The computer-readable medium according to claim 7, wherein data transmitted between the source on the packet switched network and the mobile unit includes at least one of 1) video, 2) audio, 3) text, 4) graphic, 5) still video, and 6) programmatic data.

* * * * *